(12) United States Patent
Simpson et al.

(10) Patent No.: US 11,692,495 B2
(45) Date of Patent: Jul. 4, 2023

(54) PRIME MOVER LOAD CONTROL ON MULTI-SPEED GENERATOR SET

(71) Applicant: THERMO KING LLC, Minneapolis, MN (US)

(72) Inventors: John G Simpson, Inver Grove Heights, MN (US); Randy S. Burnham, St. Michael, MN (US); Kyle J. Gleason, Burnsville, MN (US)

(73) Assignee: THERMO KING LLC, Minneapolis, MN (US)

( * ) Notice: Subject to any disclaimer, the term of this patent is extended or adjusted under 35 U.S.C. 154(b) by 0 days.

(21) Appl. No.: 17/731,930

(22) Filed: Apr. 28, 2022

(65) Prior Publication Data

US 2022/0349356 A1  Nov. 3, 2022

Related U.S. Application Data

(60) Provisional application No. 63/182,289, filed on Apr. 30, 2021.

(51) Int. Cl.
*F02D 31/00* (2006.01)
*B60H 1/00* (2006.01)
(Continued)

(52) U.S. Cl.
CPC ....... *F02D 31/007* (2013.01); *B60H 1/00364* (2013.01); *B60H 1/00428* (2013.01);
(Continued)

(58) Field of Classification Search
CPC . F02B 27/00; B60H 1/00364; B60H 1/00428; B60H 1/3232; F25D 29/003;
(Continued)

(56) References Cited

U.S. PATENT DOCUMENTS 4,899,549 A * 2/1990 Berge ............... F25D 29/003
236/75
4,903,502 A * 2/1990 Hanson ............. F25D 29/003
62/157
(Continued)

OTHER PUBLICATIONS

Extended European Search Report, issued in the corresponding European patent application No. 22170372.1, dated Sep. 22, 2022, 8 pages.

*Primary Examiner* — John M Zaleskas
(74) *Attorney, Agent, or Firm* — Hamre, Schumann, Mueller & Larson, P.C.

(57) ABSTRACT

A generator set for a transport climate control unit is provided that is operable at a first frequency and a second frequency. The generator set includes a generator, a prime mover configured to operate at a first non-zero speed and a second non-zero speed that is less than the first non-zero speed, and a genset controller configured to control operation of the generator set. When operating at the first non-zero speed, the genset controller is configured to monitor a prime mover load parameter to determine whether the prime mover is approaching or has exceeded an overload or stall situation. The genset controller is configured to reduce the speed of the prime mover from the first non-zero speed to the second non-zero speed to prevent the overload or stall situation.

14 Claims, 4 Drawing Sheets

(51) Int. Cl.
*F02D 29/06* (2006.01)
*B60H 1/32* (2006.01)

(52) U.S. Cl.
CPC ........... *B60H 1/3232* (2013.01); *F02D 29/06* (2013.01); *F02D 2200/10* (2013.01)

(58) Field of Classification Search
CPC .... F02D 2200/10; F02D 29/06; F02D 31/001; F02D 31/007; F02D 41/083; F25B 49/02
See application file for complete search history.

(56) References Cited

U.S. PATENT DOCUMENTS

| | | | | |
|---|---|---|---|---|
| 4,977,751 | A * | 12/1990 | Hanson | F25D 29/003 62/81 |
| 5,557,938 | A * | 9/1996 | Hanson | F02D 29/04 62/239 |
| 5,977,646 | A * | 11/1999 | Lenz | H02P 9/04 290/400 |
| 2002/0162344 | A1* | 11/2002 | Reason | F25B 41/34 62/217 |
| 2008/0087029 | A1* | 4/2008 | Renken | B60H 1/3226 62/134 |
| 2012/0167605 | A1* | 7/2012 | Ikemiya | F25D 11/003 62/126 |
| 2013/0283826 | A1* | 10/2013 | Burnham | B60K 11/02 62/56 |
| 2013/0289762 | A1* | 10/2013 | Olaleye | B60H 1/00014 700/228 |
| 2013/0289847 | A1* | 10/2013 | Olaleye | F02D 41/02 701/102 |
| 2013/0327285 | A1* | 12/2013 | Burnham | F02D 31/001 123/2 |
| 2014/0144164 | A1* | 5/2014 | Steele | B60H 1/3222 62/115 |
| 2015/0000636 | A1* | 1/2015 | Stockbridge | F02D 31/001 123/350 |
| 2015/0013357 | A1* | 1/2015 | Stockbridge | F02D 41/0205 62/126 |
| 2015/0184912 | A1* | 7/2015 | Nelson | B60H 1/3226 62/126 |
| 2015/0252805 | A1* | 9/2015 | Burnham | F04C 28/28 417/44.1 |
| 2015/0328953 | A1* | 11/2015 | Sulc | F02D 41/021 62/207 |
| 2015/0330321 | A1* | 11/2015 | Lucht | F02D 29/06 701/104 |
| 2016/0025397 | A1* | 1/2016 | Burnham | H02P 9/30 62/115 |
| 2016/0348961 | A1* | 12/2016 | Olaleye | B60H 1/00964 |
| 2017/0050494 | A1* | 2/2017 | Steele | B60H 1/3232 |
| 2017/0057323 | A1* | 3/2017 | Neu | F25B 49/02 |
| 2018/0222278 | A1* | 8/2018 | Mizuma | B60H 1/0045 |
| 2018/0306105 | A1* | 10/2018 | Burnham | F02D 29/06 |
| 2018/0370383 | A1* | 12/2018 | Schumacher | B60L 3/0092 |
| 2019/0061473 | A1* | 2/2019 | Dykes | B60H 1/3208 |
| 2019/0137157 | A1* | 5/2019 | Nelson | F25B 31/02 |
| 2020/0207184 | A1 | 7/2020 | Schumacher et al. | |
| 2020/0208636 | A1* | 7/2020 | Burnham | F04C 28/08 |
| 2022/0203802 | A1* | 6/2022 | Lucht | B60H 1/00264 |

* cited by examiner

PRIME MOVER LOAD CONTROL ON MULTI-SPEED GENERATOR SET

FIELD OF TECHNOLOGY

The embodiments disclosed herein generally relate to a generator set that can be used for powering a transport climate control system. More specifically, the embodiments disclosed herein relate to a control method and system for a multi-speed generator set that may be configured to change a speed of the generator set based on power demand from the transport climate control system.

BACKGROUND

A transport climate control system is generally used to control an environmental condition (e.g., temperature, humidity, air quality, and the like) within an internal space of a transport unit (e.g., a truck, a container (such as a container on a flat car, an intermodal container, etc.), a box car, a semi-tractor, a bus, or other similar transport unit). The transport climate control system can include a transport climate control unit and can maintain environmental condition(s) of the internal space to maintain cargo (e.g., produce, frozen foods, pharmaceuticals, etc.).

Some existing transport units may include a generator set that supplies power to components of the transport climate control system. These generator sets are typically attached directly to the transport unit or transport unit chassis, and include a prime mover to power a generator, as well as a genset controller configured to control operation of the generator set.

SUMMARY

The embodiments described herein relate to a control method and system for a multi-speed generator set that may be configured to change a speed of the generator set based on power demand from the transport climate control system.

In particular, the embodiments described herein can monitor a load on the generator set and shift a rotational speed of the prime mover when a prime mover of the generator set is approaching an overload or stall situation.

It will be appreciated that a generator set, as described herein, can be sized to operate in the majority of demand conditions. However, due to torque limitations of a prime mover, situations can exist that can cause the power demand on the prime mover of the generator set to exceed what is available even when operating at a first non-zero speed or high speed (e.g., ~1800 RPM). When the power demand of the prime mover is approaching or has exceeded a maximum load capacity of the prime mover at a current prime mover speed, an overload or stall situation can occur. When a prime mover is on the verge of an overload or stall situation, any slight increase in demand or decrease in prime mover capacity (for example due to environmental conditions can result in a prime mover stall). A prime mover stall can cut power available to a transport climate control system until the prime mover can be restarted. This can result in damage to any cargo stored in climate controlled space of a transport unit that is being conditioned by the transport climate control system.

A prime mover can approach an overload or stall situation when demand on the prime mover is approaching a maximum load capacity of the prime mover at the current prime mover speed. Demand on the prime mover can be caused by, for example, at relatively high ambient temperatures (e.g., greater than a standard operation condition such as, for example, 25° C.), and/or relatively high load demand by the transport climate control system (e.g., during an initial pulldown of the transport climate control system to a desired setpoint temperature). A prime mover can also approach an overload or stall situation during relatively low load demand by the transport climate control system when other variables (e.g., clogged/damaged radiator coil or air filter, obstruction to fluid flow (e.g., air flow) into a condenser coil or evaporator coil of a transport climate control system powered by the generator set, obstruction to a fuel flow to the prime mover, prime mover deration, etc.) are affecting performance of the prime mover.

It will be appreciated that reducing a rotational speed of a prime mover of a generator set can reduce a power consumption from one or more components of a transport climate control system as well as reduce any parasitic losses from the prime mover. The reduced power consumption from the one or more components of the transport climate control system can thereby reduce power demand on the prime mover of the generator set. Accordingly, an overload or stall situation of the prime mover can be prevented.

The embodiments described herein can thereby avoid an overload or stall situation of the prime mover. The embodiments described herein can also optimize use of the prime mover of the generator set, maintain power supply to the transport climate control system, and limit the risk of power loss.

In one embodiment, a generator set for a transport climate control unit is provided that is operable at a first frequency and a second frequency. The generator set includes a generator, a prime mover configured to operate at a first non-zero speed and a second non-zero speed that is less than the first non-zero speed, and a genset controller configured to control operation of the generator set. When operating at the first non-zero speed, the genset controller is configured to monitor a prime mover load parameter to determine whether the prime mover is approaching or has exceeded an overload or stall situation. The genset controller is configured to reduce the speed of the prime mover from the first non-zero speed to the second non-zero speed to prevent the overload or stall situation.

In another embodiment, a method of controlling a multi-speed generator set that is configured to power a transport climate control system while in transit is provided. The multi-speed generator set includes a controller and a prime mover coupled to a generator. The method includes the prime mover operating at a first non-zero speed. The method also includes the controller monitoring a prime mover load parameter of the prime mover while the prime mover is operating at the first non-zero speed. Also, the method includes the controller comparing the prime mover load parameter to an overload or stall threshold while the prime mover is operating at the first non-zero speed. Further, the method includes the prime mover switching from the first non-zero speed to a second non-zero speed that is lower than the first non-zero speed when the controller determines that the prime mover load parameter is greater than the overload or stall threshold to prevent an overload or stall situation. The method also includes the prime mover maintaining operation at the first non-zero speed when the controller determines that the prime mover load parameter is less than or equal to the overload or stall threshold to prevent an overload or stall situation.

In yet another embodiment, a multi-speed generator set that is configured to power a transport climate control system while in transit is provided. The multi-speed generator set includes a prime mover, a generator coupled to the prime mover and a controller configured to control operation of the multi-speed generator set. The prime mover is configured to operate at a first non-zero speed and a second non-zero speed that is less than the first non-zero speed. The controller is configured to: monitor a prime mover load parameter of the prime mover while the prime mover is operating at the first non-zero speed, compare the prime mover load parameter to an overload or stall threshold while the prime mover is operating at the first non-zero speed, instruct the prime mover to switch from the first non-zero speed to the second non-zero speed when the controller determines that the prime mover load parameter is greater than the overload or stall threshold to prevent an overload or stall situation, and instruct the prime mover to maintain operation at the first non-zero speed when the controller determines that the prime mover load parameter is less than or equal to the overload or stall threshold to prevent an overload or stall situation.

Other aspects of the invention will become apparent by consideration of the detailed description and accompanying drawings.

BRIEF DESCRIPTION OF THE DRAWINGS

References are made to the accompanying drawings that form a part of this disclosure, and which illustrate embodiments in which the systems and methods described in this Specification can be practiced.

Like reference numbers represent like parts throughout.

DETAILED DESCRIPTION

Some transport units can include a generator set to supply power to a transport climate control system of a transport unit, so that the transport unit can maintain a desired climate within a climate controlled space of the transport unit.

In the following description of the illustrated embodiments, embodiments to help prevent an overload or stall condition are disclosed. The embodiments described herein can be configured to monitor an operation condition of a prime mover of a generator set and regulate the prime mover speed of the generator set according to the prime mover operation condition. In one embodiment, a prime mover percent load may be monitored by a genset controller. When the genset controller determines that the prime mover percent load is approaching an overload or stall situation, the genset controller can reduce the rotational speed of the prime mover and thereby reduce a load demand by a transport climate control system and reduce any parasitic losses from the prime mover. Accordingly, the prime mover can be prevented from experiencing an overload or stall situation.

A generator set ("genset") generally includes the combination of a prime mover (e.g., an engine such as a diesel engine) with an electrical machine (e.g., a generator) that can be used to generate electrical power. As described in more detail below, a generator set can also include the combination of a battery source and an inverter that can also be used to generate electrical power. A genset can be used to power equipment when a utility power source is unavailable.

A transport climate control system is generally used to control one or more environmental conditions such as, but not limited to, temperature, humidity, air quality, or combinations thereof, of a transport unit. Examples of transport units include, but are not limited to a truck, a container (such as a container on a flat car, an intermodal container, a marine container, a rail container, etc.), a box car, a semi-tractor, a mass-transit vehicle (such as a passenger bus, a passenger train, etc.), or other similar transport unit. A climate controlled transport unit can be used to transport perishable items such as pharmaceuticals, produce, frozen foods, and meat products and/or can be used to provide climate comfort for passengers in a passenger space of a mass-transit vehicle. The transport climate control system may include a vapor-compressor type climate controlled system, a thermal accumulator type system, or any other suitable climate controlled system that can use a working fluid (e.g., refrigerant, etc.), cold plate technology, or the like.

A transport climate control system can include a climate control unit (CCU) attached to a transport unit to control one or more environmental conditions (e.g., temperature, humidity, air quality, etc.) of a climate controlled space of the climate controlled transport unit. The CCU can include, without limitation, a climate control circuit (including, for example, a compressor configured to compress a working fluid (e.g., refrigerant), a condenser, an expansion valve, and an evaporator), and one or more fans or blowers to control the heat exchange between the air within the climate controlled space and the ambient air outside of the climate controlled transport unit.

An overload or stall situation can occur when a load demand on the prime mover is approaching or has exceeded a maximum load capacity of the prime mover at the current prime mover speed even when operating at a first non-zero speed or high speed (e.g., ~1800 RPM).

References are made to the accompanying drawings that form a part hereof, and in which is shown by way of illustration of the embodiments in which the embodiments may be practiced. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. It is to be understood that the phraseology and terminology used herein is for the purpose of description and should not be regarded as limiting.

Figure 1A:
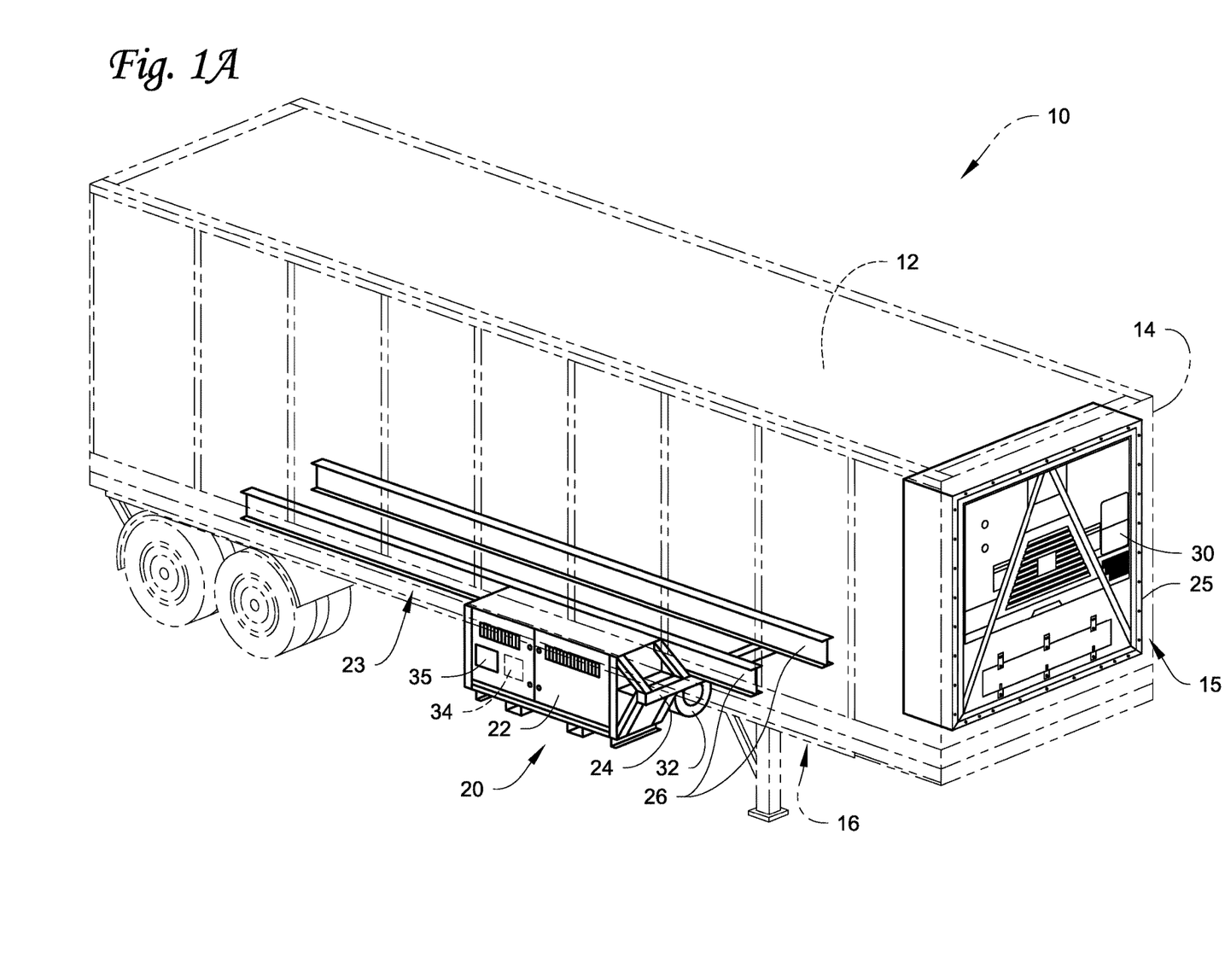
FIG. 1A illustrates a perspective view of a transport unit with a transport climate control system powered by a generator set, according to one embodiment.
Figure 1B:
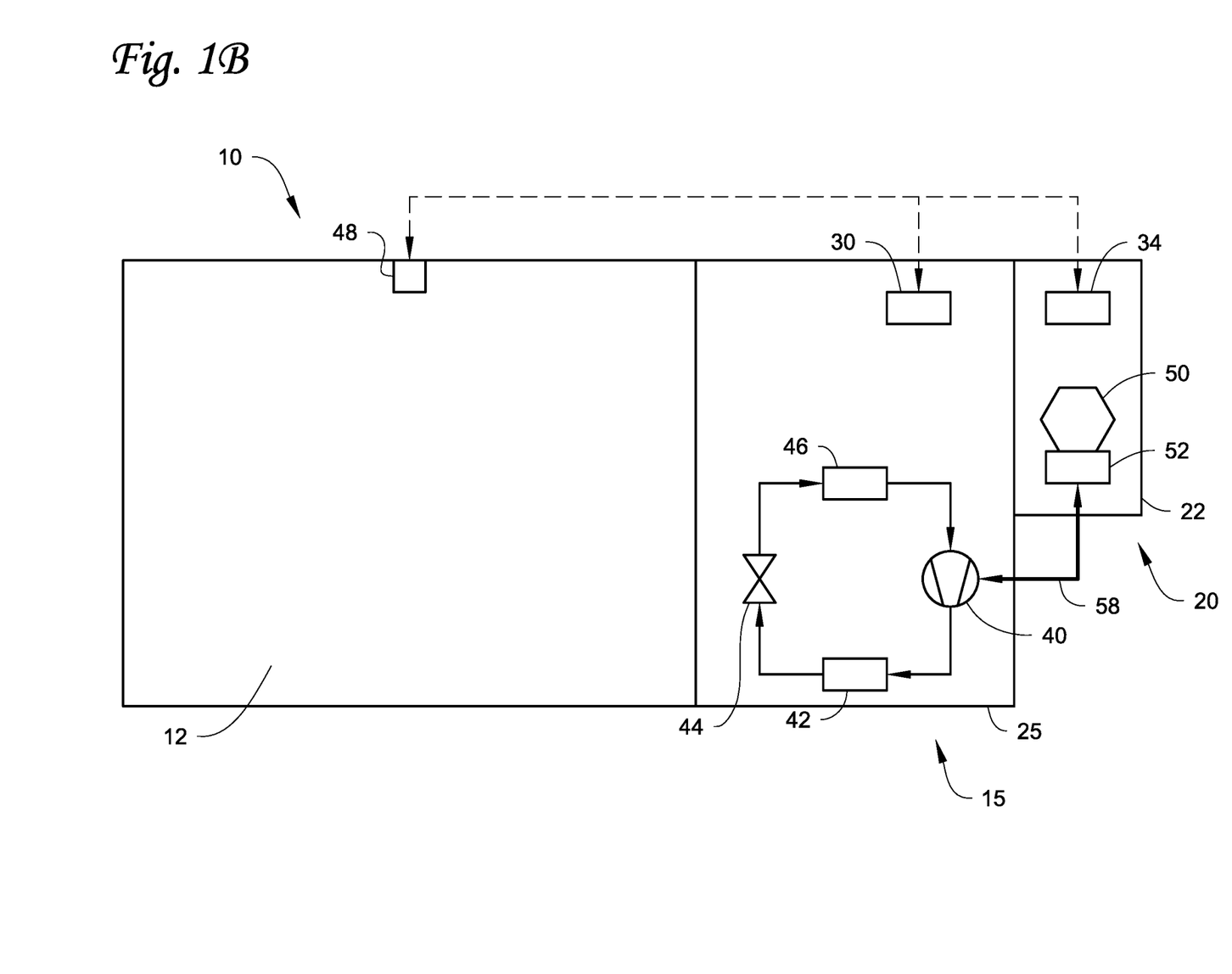
FIG. 1B illustrates a schematic view of the transport unit, the transport climate control system, and the generator set shown in FIG. 1A, according to one embodiment.

FIGS. 1A-B illustrate a transport unit 10 with a transport climate control system 15 and a generator set 20, according to one embodiment. The transport unit 10 shown in FIGS. 1A-B is an intermodal container that can be used across different modes of transport including, for example, ship, rail, tractor-trailer, etc. It will be appreciated that the transport unit 10 is not limited to an intermodal container and can be any type of transport unit (e.g., a truck, a container (such as a container on a flat car, a marine container, etc.), a box car, a semi-tractor, a passenger bus, or other similar transport unit), etc. that uses a generator set to power one or more loads on the transport unit (e.g., a transport climate control system).

The transport climate control system 15 includes a climate control unit (CCU) 25 that provides environmental control (e.g. temperature, humidity, air quality, etc.) within a climate controlled space 12 of the transport unit 10. The climate control system 15 also includes a programmable climate controller 30 and one or more sensors (not shown) that are configured to measure one or more parameters of the climate control system 15 (e.g., an ambient temperature outside of the transport unit 10, a space temperature within the climate controlled space 12, an ambient humidity outside of the transport unit 10, a space humidity within the climate controlled space 12, etc.) and communicate parameter data to the climate controller 30. The transport climate control system 15 may be, for example, a vapor-compressor type climate control system, or any other suitable climate control systems that can use a working fluid (e.g., refrigerant), cold plate technology, etc.

The CCU 25 is disposed on a front wall 14 of the transport unit 10. In other embodiments, it will be appreciated that the CCU 25 can be disposed, for example, on a rooftop or another wall of the transport unit 10. As shown in FIG. 1B, the CCU 25 includes an electric compressor 40, a condenser 42, an expander (e.g., expansion valve) 44, an evaporator 46, and the climate controller 30. In some embodiments, the electric compressor 40 can be, for example, a reciprocal compressor, a digital scroll compressor, a screw compressor, a reciprocal compressor with a variable frequency drive, etc.

The CCU 25 can also include one or more condenser fans (not shown) to direct air out of the CCU 25 into the ambient outside of the transport unit and one or more evaporator blowers (not shown) to direct conditioned air into the climate controlled space 12. The CCU 25 conditions the air within the climate controlled space 12 to a desired climate (e.g., temperature, humidity, etc.). For example, a set-point temperature may be selected by a user and programmed into the climate controller 30 such that the transport climate control system 15 will operate to maintain the temperature within the climate controlled space 12 at the setpoint temperature. In other embodiments, the transport climate control system 15 may include a heating system, an air-filtration system, a spray system for ripening agents or other products, or other components, as desired.

The climate controller 30 may comprise a single integrated control unit or may comprise a distributed network of climate controller elements (not shown). The number of distributed control elements in a given network can depend upon the particular application of the principles described herein. The climate controller 30 is configured to control operation of the climate control system 15 including the transport climate control circuit. As shown in FIG. 1B, the climate controller 30 communicates with a sensor 48 positioned within the climate controlled space 12, and operates the transport climate control system 15 to maintain the desired climate. Many operational modes may be used to control the transport climate control system 15 including, for example, start/stop and continuous operational modes. The illustrated sensor 48 can be a temperature sensor that returns a signal indicative of the temperature within the climate controlled space 12. In other embodiments, more than one sensor 48 may be positioned throughout the climate controlled space 12. In addition, other sensors or systems may communicate with the climate controller 30, as desired.

The transport climate control system 15 is powered by the generator set 20 that can distribute power to the climate control system 15 when a utility power source is unavailable. As shown in FIG. 1B, the generator set 20 powers the transport climate control system 15 via a connection 58 which can be, for example, a power cable.

The illustrated generator set 20 is removably attached to the transport unit 10 such that the generator set 20 may be attached to the transport unit 10 when required (e.g., during transit on a train), and removed when the generator set 20 is not required (e.g., when being stored in a location where external power (such as, for example, utility power) is available). For example, while the transport unit 10 is being stored at a shipping dock external power lines may be available to power the transport climate control system 15 such that the generator set 20 is not necessary. While in transit, for example on a rail or train, the generator set 20 may be required to power the transport climate control system 15.

In this embodiment, the generator set 20 is disposed on a bottom wall 16 of the transport unit 10 and electrically connected to one or more components of the climate control system 15 (e.g., the electric compressor 40, one or more fans and/or blowers (not shown), the climate controller 30, one or more sensors within the CCU 25, etc.).

In this embodiment, the generator set 20 includes a housing 22 attached to a frame 23 by a mounting assembly 24. The mounting assembly 24 can extend between the housing 22 and cross members 26 that are part of the frame 23. The mounting assembly 24 can be made of a high-strength material (e.g., steel, etc.) to rigidly attach the generator set 20 to the transport unit 10.

As shown in FIG. 1B, the housing 22 can house a prime mover 50, a generator 52, and a generator controller 34. In some embodiments, the housing 22 can also include, for example, a radiator (not shown), one or more radiator fans (not shown), etc. The illustrated prime mover 50 can be an internal combustion engine (e.g., a diesel engine) that includes an automatic starter and drives the generator 52. In some embodiments, the prime mover 50 can be a mechanically governed internal combustion engine. In some embodiments, the prime mover 50 can be an electronically governed internal combustion engine. With respect to this application, a generator is any electric machine that converts mechanical energy into electric energy. In some embodiments, the prime mover 50 can operate at a plurality of speeds such as ~1500 revolutions per minute (RPM) and ~1800 RPM. The illustrated generator 52 can be an alternating current (AC) generator that produces a 50 hertz or 60 hertz alternating current output depending on the speed of the prime mover 50. The generator 52 supplies electricity to the transport climate control system 15 and any other systems that may be included in the transport unit 10. It will be appreciated that operating the prime mover 50 at ~1800 RPM can provide higher torque and therefore more output power from the generator 52 to the transport climate control system 15 as opposed to operating the prime mover 50 at ~1500 RPM.

As shown in FIG. 1A, the housing 22 also includes a human machine interface (HMI) 35, with which a user can input, for example, instructions to a genset controller 34 of the generator set 20.

The genset controller 34 is configured to control operation of the generator set 20 including a speed of the prime mover 50. In some embodiments, the genset controller 34 is not capable and/or may not communicate with the climate controller 30. In other embodiments, the genset controller 34 can communicate with the climate controller 30 and the sensor 40 via, for example, power-line transmission, data cables, or another communication medium, to control the generator set 20. In yet some other embodiments, the genset controller 30 may not communicate with any sensors, but rather communicate only with the climate controller 30. Operation of a generator set, such as the generator set 20, is discussed in further detail below with respect to FIGS. 2 and 3.

As shown in FIG. 1A, a fuel tank 32 is also provided and configured to supply fuel to the generator set 20 (particularly the prime mover 50).

In some embodiments, the rate of rotation of the one or more condenser fans and the one or more evaporator blowers of the transport climate control system 15 can be proportional to a frequency of power supplied by the generator set 20. Accordingly, as the frequency of power supplied by the generator 52 changes from 60 Hertz to 50 Hertz (e.g., the speed of the prime mover 50 changes from ~1800 RPM to ~1500 RPM), the one or more condenser fans and the one or more evaporator blowers will spin slower. Accordingly, the electrical load demand by the one or more condenser fans and the one or more evaporator blowers will decrease.

Also, when the one or more evaporator blowers spin at a slower speed, the amount of heat generated by one or more motors of the evaporator blowers that can be introduced into the climate controlled space 12. Less heat introduced into the climate controlled space can reduce the amount of heat to be removed by the transport climate control system 15 and thus the amount of power demanded by the transport climate control system 15 (including, for example, the electrical compressor 40, the one or more condenser fans, the one or more evaporator blowers, etc.).

Further, in some embodiments, the rate at which one or more radiator fans of the generator set 22 rotate can be proportional to a speed of the prime mover 50. Accordingly, when the speed of the prime mover 50 drops from a first non-zero speed (e.g., ~1800 RPM) to a second non-zero speed (e.g., ~1500 RPM), the one or more radiator fans will spin slower. Accordingly, a parasitic load on the prime mover 50 will be reduced.

In some embodiments, when the electric compressor 40 is a digital scroll compressor, the duty cycle of the compressor 40 can change based on a change in frequency of power supplied by the generator set 20. Accordingly, as the frequency of power supplied by the generator 52 changes from 60 Hertz to 50 Hertz (e.g., the speed of the prime mover 50 changes from ~1800 RPM to ~1500 RPM), the peak power demanded by the electric compressor 40 can be reduced. It will be appreciated that the amount of time the compressor 40 is operating during a given duty cycle may increase but the overall electrical load demanded by electric compressor 40 will decrease.

Figure 2:
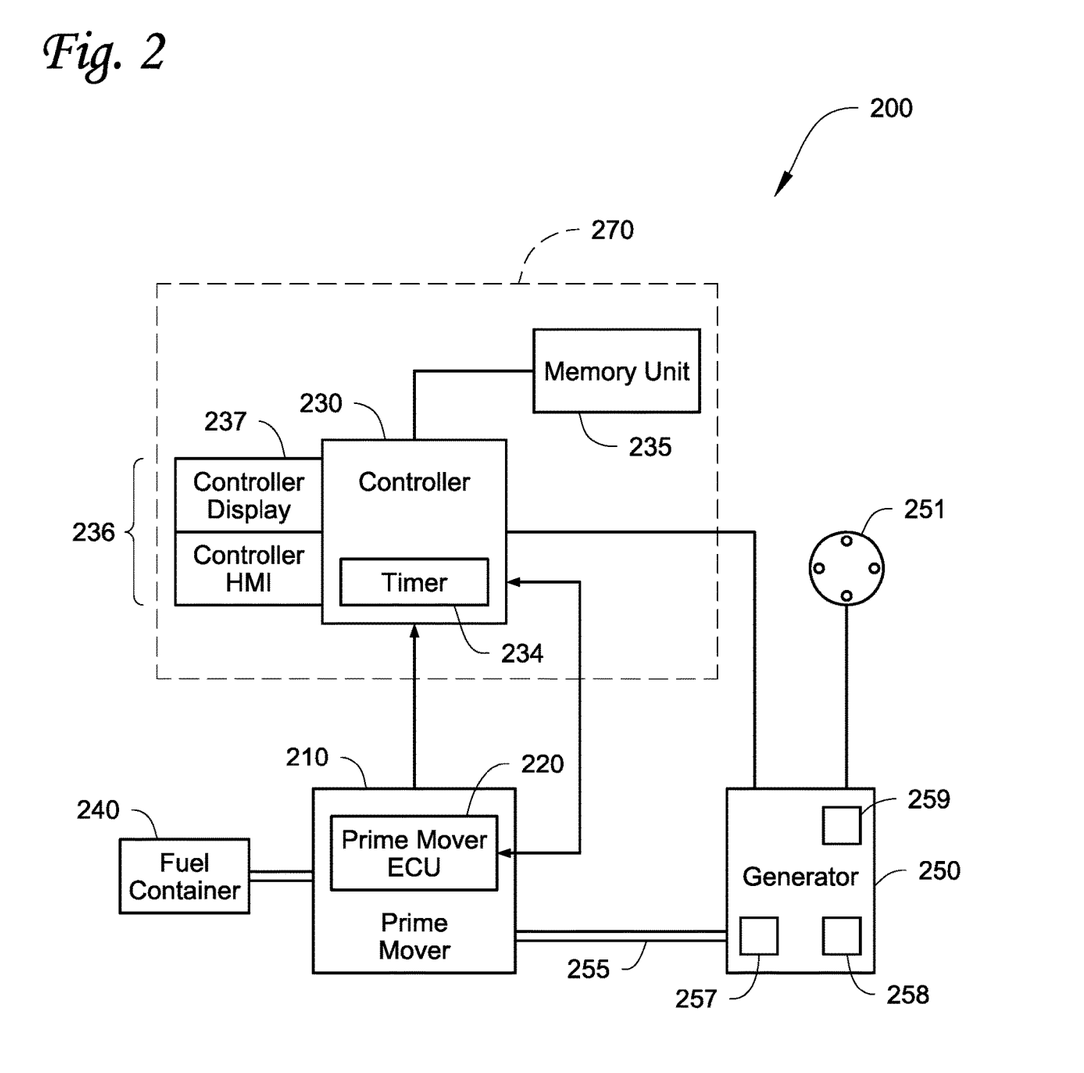
FIG. 2 is a schematic view of a generator set, according to one embodiment.

FIG. 2 illustrates a schematic view of an embodiment of a generator set 200, which may be configured to provide power to a transport climate control system, such as the transport climate control system 15 as shown in FIGS. 1A-B. The generator set 200 generally includes a prime mover 210 with an engine control unit (ECU) 220, a genset controller 230, a fuel container 240 and a generator 250. In some embodiments, the prime mover 210 may not include the ECU 220. The generator set 200 can be disposed in the housing 22 as shown in FIG. 1A.

The illustrated prime mover 210 may be an internal combustion engine (e.g., diesel engine, etc.) that may generally have a cooling system (e.g., water or liquid coolant system), an oil lubrication system, and an electrical system (none shown). An air filtration system (not shown) filters air directed into a combustion chamber (not shown) of the prime mover 210. The prime mover 210 may also be an engine that is configured specifically for a transport climate control system. The fuel container 240 is in fluid communication with the prime mover 210 to deliver a supply of fuel to the prime mover 210.

The prime mover 210 can be controlled by the ECU 220. The ECU 220 can be configured to regulate an amount of fuel delivered to the prime mover 210 and can be configured to operate the prime mover 210 at least at a first non-zero speed (e.g., high speed) and a second non-zero speed (e.g., low speed). The ECU 220 is configured so that the prime mover 210 can be maintained at least at either the first non-zero speed or the second non-zero speed in a range of prime mover loads on the prime mover 210.

The ECU 220 is coupled with the controller 230. The genset controller 230 is configured to receive information from the ECU 220, and command the ECU 220 to vary the prime mover 210 between the first non-zero speed and the second non-zero speed. In some embodiments, the first non-zero speed can be ~1800 RPM, and the second non-zero speed can be ~1500 RPM. In other embodiments, the first and second non-zero speeds may be different from ~1800 RPM and ~1500 RPM.

A generator 250 can be coupled to the prime mover 210 by a flex disk 255 that transfers mechanical energy from the prime mover 210 to the generator 250. In some embodiments, the generator 250 can also be coupled to the prime mover 210 indirectly by a driving belt. The generator 250 includes a power receptacle 251 that is in electrical communication with, for example, a CCU 25 (as shown in FIG. 1B) via a power cable 58 to provide electrical power to the transport climate control system 15.

The generator 250 may be a 3-phase AC generator that generally includes a rotor 257, a stator 258, and a voltage regulator 259. The rotor 257 is coupled to the flex disk 255 such that the prime mover 210 is operable to rotatably drive the rotor 257 at least at the first non-zero speed and the second non-zero speed. The stator 258 is usually a stationary component of the generator 250 that includes magnetic pole pairs (e.g., two pole pairs).

The voltage regulator 259 includes a field voltage and a field current that are generated by a regulation element (not shown) coupled to the voltage regulator 259. In some embodiments, the regulation element may include batteries or other solid-state components that generate a direct current through the voltage regulator 259. The field voltage and the field current define a field excitation. The field excitation of the generator 250 is generally considered a field of the generator 250. The field can be one part of the rotor 257 and the stator 258.

Rotation of the rotor 257 through the magnetic field induces an output current from the generator 250. The induced output current produces an output voltage of the generator 250 that is directed through the power receptacle 251 to the transport climate control system. It is to be noted that other types of generators can be used in place of the generator 250. The generator 250 as described herein is exemplary only.

The generator 250 further includes an output frequency that can be affected by the speed of the prime mover 210 or the field voltage of the generator 250. In some embodiments, the generator 250 can provide a first output frequency (e.g., ~60 Hertz) when the prime mover 210 is operated at the first non-zero speed, and can provide a second output frequency (e.g., ~50 Hertz) when the prime mover 210 is operated at the second non-zero speed. The transport climate control system may be operated at both frequencies.

The output voltage of the generator 250 may be affected by the output frequency. As such, the generator 250 can provide a first output voltage in response to operation of the generator 250 at the first frequency. The generator 250 can provide a second output voltage in response to operation of the generator 250 at the second frequency. For example, when the generator 250 is operated at the first non-zero speed/frequency (e.g., ~1800 rpm/60 Hertz), the first output voltage can be about 460 volts. When the generator 250 is operated at the second non-zero speed/frequency (e.g., ~1500 rpm/50 Hertz), the second output voltage can be about 380 volts. Thus, the speed of the prime mover 210 can affect the frequency and output voltage of the generator 250.

The generator 250 can be configured to provide a relatively constant load capacity that is sufficient to provide power to the transport climate control system under various loads. A load on the generator 250 corresponds to, for example, the cooling demand or load on the transport climate control system (e.g., electrical power needed by the transport climate control system), and is variable in response to changes in the load on the transport climate control system.

The ECU 220 is configured to control the operation of the prime mover 210 and monitor/obtain prime mover operation condition data. The ECU 220 may have a microprocessor that can communicate with an array of sensors that are configured to obtain prime mover speed, oil temperatures, piston positions, etc. By analyzing the readings from the array of sensors, the ECU 220 can obtain the operation condition data of the prime mover 210. In some embodiments, the ECU 220 can obtain the operation condition data of the prime mover 210 almost in real-time. The ECU 220 can be, for example, configured to control a fuel pump so that an amount of fuel delivered to combustion chambers of the prime mover 210 can be controlled by the ECU 220. By regulating the amount of fuel delivered, the ECU 220 can be configured to maintain the prime move 210 at an operational speed relatively constantly even when the load on the prime mover 210 may change. In the illustrated embodiment as shown in FIG. 2, the ECU 220 is configured so that the ECU 220 can maintain the prime move 210 at least at two relatively constant operational speeds, for example ~1500 RPM and ~1800 RPM.

As described above, the genset controller 230 is coupled with the ECU 220. The couple between the genset controller 230 and the ECU 220 can be a two-way electronic communication system. The ECU 220 can be configured to obtain the prime mover operation condition data. The ECU 220 can then send the prime mover operation condition data to the genset controller 230.

The genest controller 230 may have a microprocessor that is configured to make various operating decisions in response to the prime mover operation condition data received from the ECU 220. The operating decisions generated by the genset controller 230 can then be transmitted back to the ECU 220 via the coupling between the ECU 220 and the controller 230. After receiving the operating decisions transmitted from the genset controller 230, the ECU 220 may then operate the prime mover 210 in accordance with the operating decisions transmitted from the genset controller 230.

FIG. 2 further shows that the genset controller 230 can be configured to be in electrical communication with a timer 234, a memory unit 235, and/or an operator interface 236. The genset controller 230, the timer 234, the memory unit 235 and the operator interface 236 can be incorporated into a controller panel 270.

In some embodiments, the memory unit 235 may be a Random Access Memory ("RAM") that can maintain a data log related to parameters of the prime mover 210 and the generator 250, as a well as other data.

The operator interface 236 includes a controller display 237 and a controller human machine interface (such as HMI 35 as shown in FIG. 1A) for viewing and entering commands into the genset controller 230. The timer 234 may separately measure a duration time that the prime mover 210 operates at the first non-zero speed and/or a duration time that the prime mover 210 operates at the second non-zero speed.

In operation, the genset controller 230 and the ECU 220 can work together to operate the prime mover 210. For example, the ECU 220 can be configured to operate/maintain the prime mover 210 at the first operational speed or the second operational speed that is lower than the first operational speed. In some embodiments, for example as shown above, the first operational speed can be ~1800 RPM and the second operational speed can be ~1500 RPM.

It is to be noted that the prime mover operation condition data can be measured by parameters other than prime mover percent load. The ECU 220 can be configured to obtain other parameters correlating to the prime mover operation condition(s) and provide a prime mover operation condition value. Parameters that may be correlated to the prime mover operation condition may include, for example, an exhaust gas temperature (EGT), an alternator excitation, the amount of fuel consumed by the prime mover 210, an injection timing of the prime mover 210, a shaft speed or speed droop of the prime mover 210, an air intake flow, etc. The ECU 220 can be configured to obtain the operation parameter data and transmit values of these parameters to the genset controller 230 to represent the prime mover operation condition value. The genset controller 230 can be configured to receive the prime mover operation condition value transmitted from the ECU 220. The relationship between the fuel efficiency and these prime mover operation condition parameters can be established, for example, by testing in a laboratory setting. And a threshold may be established for each parameter to help determine the optimal prime mover speed of the prime mover 210.

It is to be noted that the parameters obtained by the ECU 220, such as the EGT temperature, the alternator excitation, the amount of fuel consumed by the prime mover 210, the injection timing of the prime mover 210, a speed droop of the prime mover 210, etc., may be correlated to the prime mover percent load of the prime mover 210. Therefore, by monitoring these parameters, the prime mover percent load of the prime mover 210 can also be obtained.

It is to be understood that the microprocessor of the ECU 220 can be configured to calculate a prime mover operation condition value (such as the prime mover percent load) based on the parameters obtained by the ECU 220. For example, the amount of fuel delivered to the prime mover and the air intake flow are correlated to the prime mover load. The microprocessor of the ECU 220 can be configured to calculate the prime mover percent load based on the amount of fuel delivered and/or the air intake flow and transmit the calculated prime mover percent load to the genset controller 230 as the prime mover operation condition value. The microprocessor of the ECU 220 can also be configured to calculate prime mover torques, prime mover percent rated torque at an operational speed, and/or calculated torque minus peak torque at an operational speed, etc. based on the parameters obtained by the ECU 220 and transmit these calculated values to the genset controller 230 as the prime mover operation condition value.

It is to be noted that in some embodiments, the ECU 220 can be configured to transmit values measured by the array of sensors to the genset controller 230. The genset controller 230 can be configured to determine/calculate, for example, prime mover percent load of the prime mover 210 based on the values transmitted by the ECU 220.

It will be appreciated that in some embodiments, the prime mover condition data is not required to be obtained by the ECU 220 and can be obtained by one or more sensors of the generator set 200.

The memory unit 235 can be configured to store a pre-entered process. The process may be entered by an operator through the operator interface 236. Or the process may be entered into the memory unit 235 during a manufacturing process of the controller panel 270. The process contains an engine operation condition threshold that can be set, for example, by an operator or a manufacturer. The microprocessor of the controller 230 can be configured to compare the prime mover operation condition value received from the ECU 220 to the prime mover operation condition threshold stored in the memory unit 235, and make a decision on whether to switch the operating RPM of the prime mover 210. The genset controller 230 can be configured to send this decision back to the ECU 220 so that the ECU 220 can operate the prime mover 210 accordingly.

Figure 3:
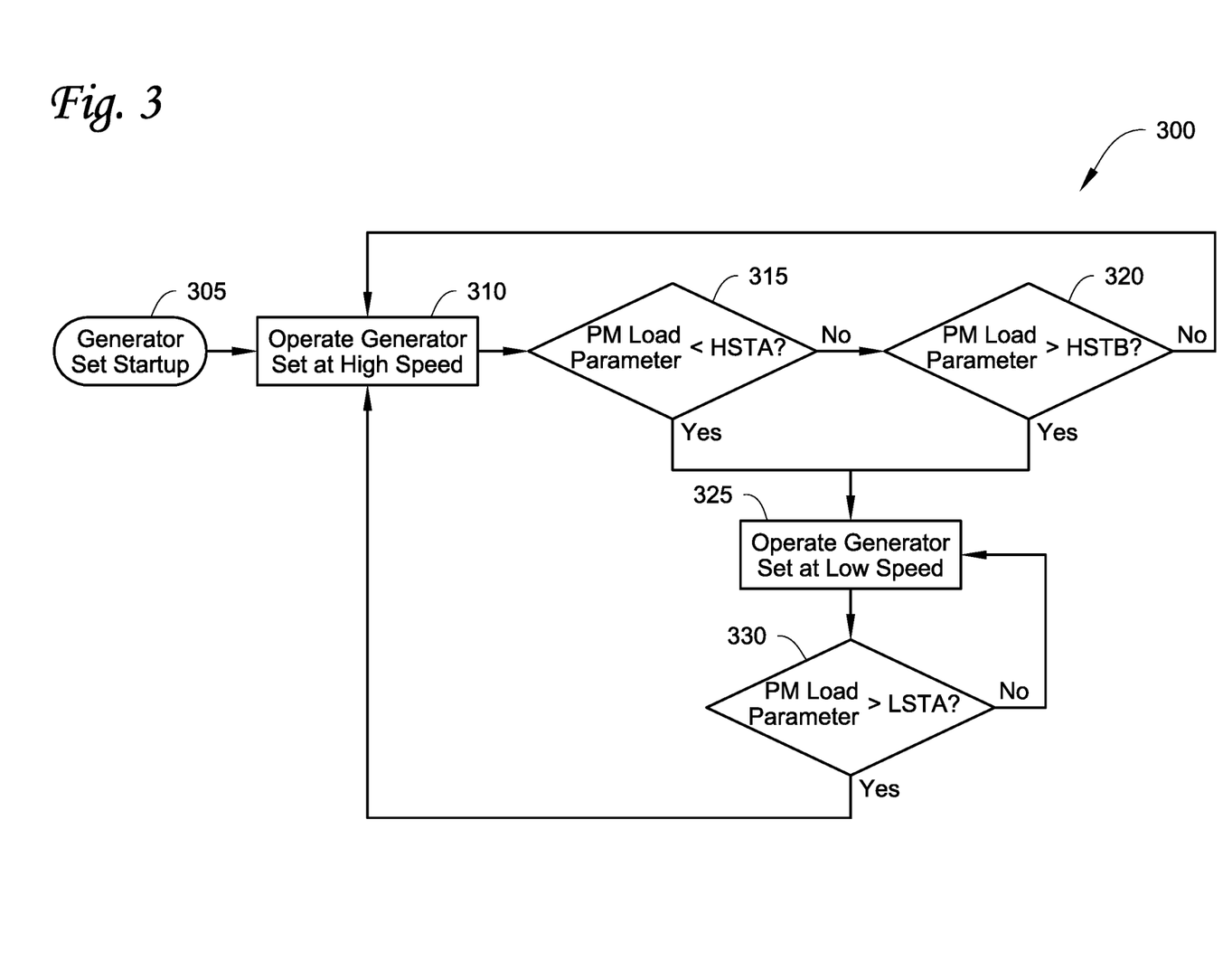
FIG. 3 is a flow chart of a method of operating a genset controller of the generator set shown in FIG. 2, according to one embodiment.

FIG. 3 shows one embodiment of a method 300 by which the genset controller 230 as shown in FIG. 2 can be operated. As discussed above, the process may be stored in the memory unit 235 as shown in FIG. 2.

The method 300 begins at 305 when the generator set 200 is started and is capable of supplying power to one or more loads (e.g., a transport climate control system such as the transport climate control system 15 shown in FIGS. 1A-B). Throughout the method 300, the genset controller 230 can be configured to continuously monitor one or more prime mover condition data regarding the operation of the prime mover 210. In some embodiments, the genset controller 230 can obtain the prime mover condition data from the ECU 220. In some embodiments, the genset controller 230 can obtain the prime mover condition data from one or more sensors of the generator set 200. In some embodiments, the prime mover condition data can include a prime mover load parameter. The prime mover load parameter can be a percent load of the prime mover 210 or another prime mover parameter that is correlated to the prime mover percent load (e.g., the EGT temperature, the alternator excitation, the amount of fuel consumed by the prime mover 210, the injection timing of the prime mover 210, a speed droop of the prime mover 210, etc.). The prime mover percent load is generally a load demand on the prime mover 210 as a percentage of a maximum load capacity of the prime mover 210 at the current prime mover speed. The method 300 then proceeds to 310.

At 310, the genset controller 230 instructs the prime mover 210 to operate at a first non-zero speed or high speed (e.g., ~1800 RPM). In some embodiments, the prime mover 210 is configured to startup at the first non-zero speed in order to allow the transport climate control system to quickly reach a desired climate (e.g., temperature, humidity) within a climate controlled space of the transport unit. In some embodiments, the prime mover 210 is configured to startup at the first non-zero speed in order to accommodate any inrush current and/or power transients that may occur upon startup of one or more components of the transport climate control system (e.g., an electric compressor, one or more condenser fans, one or more evaporator blowers). The method 300 then proceeds to 315.

At 315, the genset controller 230 determines whether the prime mover load parameter is less than a first high speed threshold HSTA. In some embodiments, the first high speed threshold HSTA can be a predetermined threshold (calculated via, for example, testing, simulation data, etc.) set to a value where it is more fuel efficient to operate the prime mover 210 at the second non-zero speed than at the first non-zero speed. When the prime mover load parameter is a prime mover percent load, the first high speed threshold HSTA can be a percentage value such as, for example, ~86%. The first high speed threshold HSTA can be a predetermined value that can be set to indicate that the prime mover 210 has a relatively low load demand from, for example, one or more components of the transport climate control system. Accordingly, the genset controller 230 can determine whether the generator set 200 can operate more efficiently (e.g., a higher fuel efficiency) by operating the prime mover 210 at the second non-zero speed (e.g., ~1500 RPM). When the genset controller 230 determines that the prime mover load parameter is less than the first high speed threshold HSTA, the method 300 proceeds to 325. When the genset controller 230 determines that the prime mover load parameter is equal to or greater than the first high speed threshold HSTA, the method 300 proceeds to 320.

At 320, the genset controller 230 determines whether the prime mover load parameter is greater than a second high speed threshold HSTB. In some embodiments, the second high speed threshold HSTB can be a predetermined threshold (calculated via, for example, testing, simulation data, etc.) set to a value indicating that the prime mover 210 is approaching or has exceeded a maximum load capacity of the prime mover at the first non-zero speed or high speed (e.g., ~1800 RPM). Accordingly, the genset controller 230 can determine whether the generator set 200 is approaching an overload or stall situation that can lead to loss of power from the prime mover 210. When the prime mover load parameter is a prime mover percent load, the second high speed threshold HSTB can be a percentage value such as, for example, ~97%. Accordingly, the genset controller 230 can determine whether the generator set 200 is approaching an overload or stall situation that can lead to loss of power from the prime mover 210. When the genset controller 230 determines that the prime mover load parameter is greater than the second high speed threshold HSTB, the method 300 proceeds to 325 in order to reduce the speed of the prime mover 210 from the first non-zero speed or high speed (e.g., ~1800 RPM) to the second non-zero speed or low speed (e.g., ~1500 RPM). By reducing the speed of the prime mover 210 when the prime mover load parameter is greater than the second high threshold HSTB, the generator set can decrease the amount of load on the prime mover 210 by the transport climate control system. When the genset controller 230 determines that the prime mover load parameter is equal to or less than the second high speed threshold HSTB, the method 300 proceeds back to 310.

At 325, the genset controller 230 instructs the prime mover 210 to operate at a second non-zero speed or low speed (e.g., ~1500 RPM). In some embodiments, the prime mover 210 can therefore operate more efficiently (e.g., have a higher fuel efficiency) at the second non-zero speed than if the prime mover 210 was operating at the first non-zero speed. The method 300 then proceeds to 330.

At 330, the genset controller 230 determines whether the prime mover load parameter is greater than a low speed threshold LSTA. In some embodiments, the low speed threshold LSTA can be a predetermined threshold (calculated via, for example, testing, simulation data, etc.) set to a value indicating that the speed of the prime mover 210 may need to increase in order keep up with the power demands of the transport climate control system by moving from the second non-zero speed or low speed (e.g., ~1500 RPM) to the first non-zero speed or high speed (e.g., ~1800 RPM). In some embodiments, by increasing the speed of the prime mover 210 to keep up with the power demands of the transport climate control system, the generator set 200 can increase its fuel efficiency. When the prime mover load parameter is a prime mover percent load, the low speed threshold LSTA can be a percentage value such as, for example, ~65%. When the genset controller 230 determines that the prime mover load parameter is greater than the low speed threshold LSTA, the method 300 proceeds back to 310. When the genset controller 230 determines that the prime mover load parameter is equal to or less than the low speed threshold LSTA, the method 300 proceeds back to 325.

Aspects

It will be appreciated that any of aspects 1-8 can be combined with any of aspects 9-16.

Aspect 1. A method of controlling a multi-speed generator set that is configured to power a transport climate control system while in transit, the multi-speed generator set including a controller and a prime mover coupled to a generator, the method comprising:

the prime mover operating at a first non-zero speed;

the controller monitoring a prime mover load parameter of the prime mover while the prime mover is operating at the first non-zero speed;

the controller comparing the prime mover load parameter to an overload or stall threshold while the prime mover is operating at the first non-zero speed;

the prime mover switching from the first non-zero speed to a second non-zero speed that is lower than the first non-zero speed when the controller determines that the prime mover load parameter is greater than the overload or stall threshold to prevent an overload or stall situation; and the prime mover maintaining operation at the first non-zero speed when the controller determines that the prime mover load parameter is less than or equal to the overload or stall threshold to prevent an overload or stall situation.

Aspect 2. The method of aspect 1, further comprising:

the controller comparing the prime mover load parameter to a second non-zero speed threshold while the prime mover is operating at the first non-zero speed;

the prime mover switching from the first non-zero speed to the second non-zero speed when the controller determines that the prime mover load parameter is less than the second non-zero speed threshold; and the prime mover maintaining operation at the first non-zero speed when the controller determines that the prime mover load parameter is greater than or equal to the second non-zero speed threshold.

Aspect 3. The method of any one of aspects 1 and 2, further comprising:

the prime mover operating at the second non-zero speed;

the controller comparing the prime mover load parameter to a first non-zero speed threshold while the prime mover is operating at the second non-zero speed;

the prime mover switching from the second non-zero speed to the first non-zero speed when the controller determines that the prime mover load parameter is greater than the first non-zero speed threshold; and the prime mover maintaining operation at the second non-zero speed when the controller determines that the prime mover load parameter is less than or equal to the first non-zero speed threshold.

Aspect 4. The method of any one of aspects 1-3, wherein the prime mover load parameter is a prime mover percent load.

Aspect 5. The method of any one of aspects 1-4, further comprising the controller obtaining the prime mover load parameter from an engine control unit (ECU) of the prime mover.

Aspect 6. The method of any one of aspects 1-5, further comprising the controller obtaining the prime mover load parameter from a sensor of the generator set.

Aspect 7. The method of any one of aspects 1-6, wherein the first non-zero speed is about 1800 revolutions per minute (RPM) and the second non-zero speed is about 1500 RPM.

Aspect 8. A multi-speed generator set that is configured to power a transport climate control system while in transit, the multi-speed generator set comprising:

a prime mover configured to operate at a first non-zero speed and a second non-zero speed that is less than the first non-zero speed;

a generator coupled to the prime mover; and a controller configured to control operation of the multi-speed generator set, wherein the controller is configured to:

monitor a prime mover load parameter of the prime mover while the prime mover is operating at the first non-zero speed, compare the prime mover load parameter to an overload or stall threshold while the prime mover is operating at the first non-zero speed, instruct the prime mover to switch from the first non-zero speed to the second non-zero speed when the controller determines that the prime mover load parameter is greater than the overload or stall threshold to prevent an overload or stall situation, and instruct the prime mover to maintain operation at the first non-zero speed when the controller determines that the prime mover load parameter is less than or equal to the overload or stall threshold to prevent an overload or stall situation.

Aspect 9. The multi-speed generator set of aspect 8, wherein the controller is configured to:

compare the prime mover load parameter to a second non-zero speed threshold while the prime mover is operating at the first non-zero speed;

instruct the prime mover to switch from the first non-zero speed to the second non-zero speed when the controller determines that the prime mover load parameter is less than the second non-zero speed threshold; and instruct the prime mover to maintain operation at the first non-zero speed when the controller determines that the prime mover load parameter is greater than or equal to the second non-zero speed threshold.

Aspect 10. The multi-speed generator set of any one of aspects 8 and 9, wherein the controller is configured to:

compare the prime mover load parameter to a first non-zero speed threshold while the prime mover is operating at the second non-zero speed;

instruct the prime mover to switch from the second non-zero speed to the first non-zero speed when the controller determines that the prime mover load parameter is greater than the first non-zero speed threshold; and instruct the prime mover to maintain operation at the second non-zero speed when the controller determines that the prime mover load parameter is less than or equal to the first non-zero speed threshold.

Aspect 11. The multi-speed generator set of any one of aspects 8-10, wherein the prime mover load parameter is a prime mover percent load.

Aspect 12. The multi-speed generator set of any one of aspects 8-11, wherein the prime mover includes an engine control unit (ECU), wherein the controller is configured to obtain the prime mover load parameter from an ECU of the prime mover.

Aspect 13. The multi-speed generator set of any one of aspects 8-12, further comprising a sensor, wherein the controller is configured to obtain the prime mover load parameter from the sensor.

Aspect 14. The multi-speed generator set of any one of aspects 8-13, wherein the first non-zero speed is about 1800 revolutions per minute (RPM) and the second non-zero speed is about 1500 RPM.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A method of controlling a multi-speed generator set that is configured to power a transport climate control system while in transit, the multi-speed generator set including a controller and a prime mover coupled to a generator, the method comprising:
   the prime mover operating at a first non-zero speed;
   the controller monitoring a prime mover load parameter of the prime mover while the prime mover is operating at the first non-zero speed;
   the controller comparing the prime mover load parameter to an overload or stall threshold while the prime mover is operating at the first non-zero speed;
   the controller determining that the prime mover load parameter is greater than the overload or stall threshold indicating that a load demand on the prime mover is approaching or has exceeded a maximum load capacity of the prime mover at the first non-zero speed; and
   the prime mover switching from the first non-zero speed to a second non-zero speed that is lower than the first non-zero speed when the controller determines that the prime mover load parameter is greater than the overload or stall threshold to prevent an overload or stall situation.

2. The method of claim 1, further comprising:
   the controller comparing the prime mover load parameter to a second non-zero speed threshold while the prime mover is operating at the first non-zero speed;
   the controller determining that the prime mover load parameter is less than the second non-zero speed threshold indicating that the prime mover is experiencing a low load demand from the transport climate control system;
   the prime mover switching from the first non-zero speed to the second non-zero speed when the controller determines that the prime mover load parameter is less than the second non-zero speed threshold.

3. The method of claim 1, further comprising:
   the prime mover operating at the second non-zero speed;
   the controller comparing the prime mover load parameter to a first non-zero speed threshold while the prime mover is operating at the second non-zero speed;
   the controller determining that the prime mover load parameter is greater than the first non-zero speed threshold to meet a load demand from the transport climate control system;
   the prime mover switching from the second non-zero speed to the first non-zero speed when the controller determines that the prime mover load parameter is greater than the first non-zero speed threshold.

4. The method of claim 1, wherein the prime mover load parameter is a prime mover percent load.

5. The method of claim 1, further comprising the controller obtaining the prime mover load parameter from an engine control unit (ECU) of the prime mover.

6. The method of claim 1, further comprising the controller obtaining the prime mover load parameter from a sensor of the generator set.

7. The method of claim 1, wherein the first non-zero speed is 1800 revolutions per minute (RPM) and the second non-zero speed is 1500 RPM.

8. A multi-speed generator set that is configured to power a transport climate control system while in transit, the multi-speed generator set comprising:
   a prime mover configured to operate at a first non-zero speed and a second non-zero speed that is less than the first non-zero speed;
   a generator coupled to the prime mover; and
   a controller configured to control operation of the multi-speed generator set, wherein the controller is configured to:
      monitor a prime mover load parameter of the prime mover while the prime mover is operating at the first non-zero speed,
      compare the prime mover load parameter to an overload or stall threshold while the prime mover is operating at the first non-zero speed, and
      instruct the prime mover to switch from the first non-zero speed to the second non-zero speed to prevent an overload or stall situation when the controller determines that the prime mover load parameter is greater than the overload or stall threshold indicating that a load demand on the prime mover is approaching or has exceeded a maximum load capacity of the prime mover at the first non-zero speed.

9. The multi-speed generator set of claim 8, wherein the controller is configured to:
   compare the prime mover load parameter to a second non-zero speed threshold while the prime mover is operating at the first non-zero speed;
   instruct the prime mover to switch from the first non-zero speed to the second non-zero speed when the controller determines that the prime mover load parameter is less than the second non-zero speed threshold indicating that the prime mover is experiencing a low load demand from the transport climate control system.

10. The multi-speed generator set of any one of claims 8 and 9, wherein the controller is configured to:
   compare the prime mover load parameter to a first non-zero speed threshold while the prime mover is operating at the second non-zero speed;
   instruct the prime mover to switch from the second non-zero speed to the first non-zero speed to meet a load demand from the transport climate control system when the controller determines that the prime mover load parameter is greater than the first non-zero speed threshold.

11. The multi-speed generator set of any one of claims 8-10, wherein the prime mover load parameter is a prime mover percent load.

12. The multi-speed generator set of any one of claims 8-11, wherein the prime mover includes an engine control unit (ECU), wherein the controller is configured to obtain the prime mover load parameter from the ECU of the prime mover.

13. The multi-speed generator set of any one of claims 8-12, further comprising a sensor, wherein the controller is configured to obtain the prime mover load parameter from the sensor.

14. The multi-speed generator set of any one of claims 8-13, wherein the first non-zero speed is 1800 revolutions per minute (RPM) and the second non-zero speed is 1500 RPM.

* * * * *